July 11, 1939. B. C. MOISE ET AL 2,165,646
FINISHING AND SEVERING TOOL
Filed Aug. 9, 1938 3 Sheets—Sheet 1
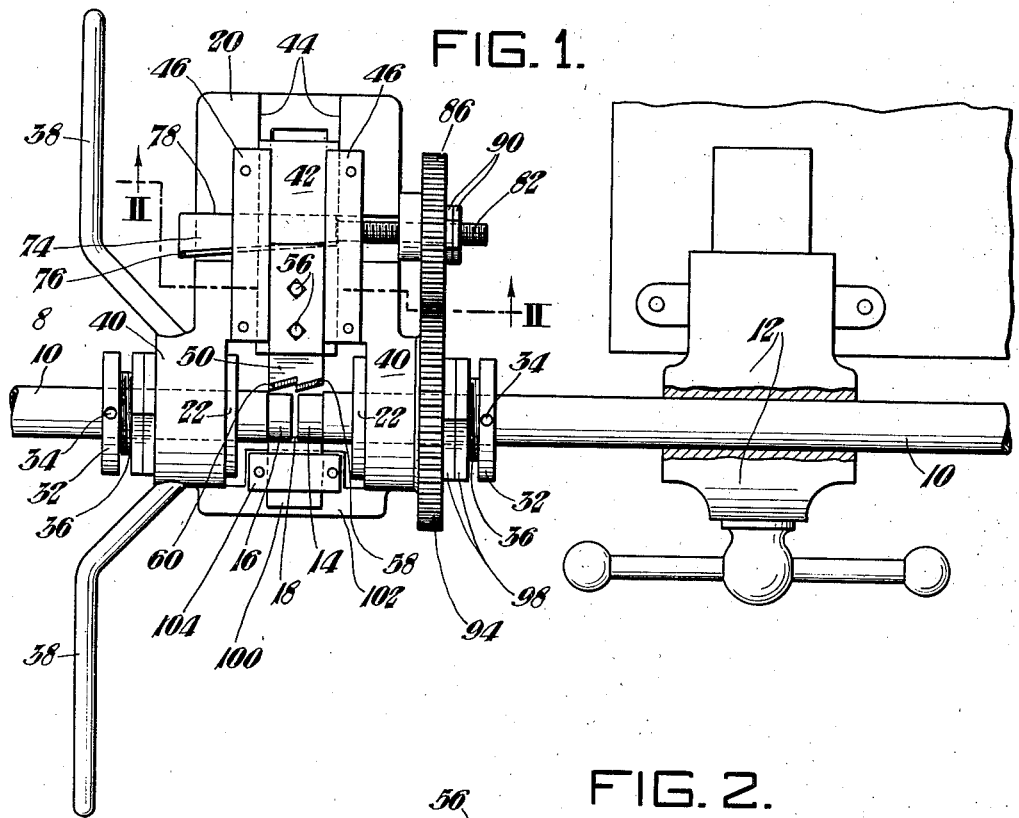
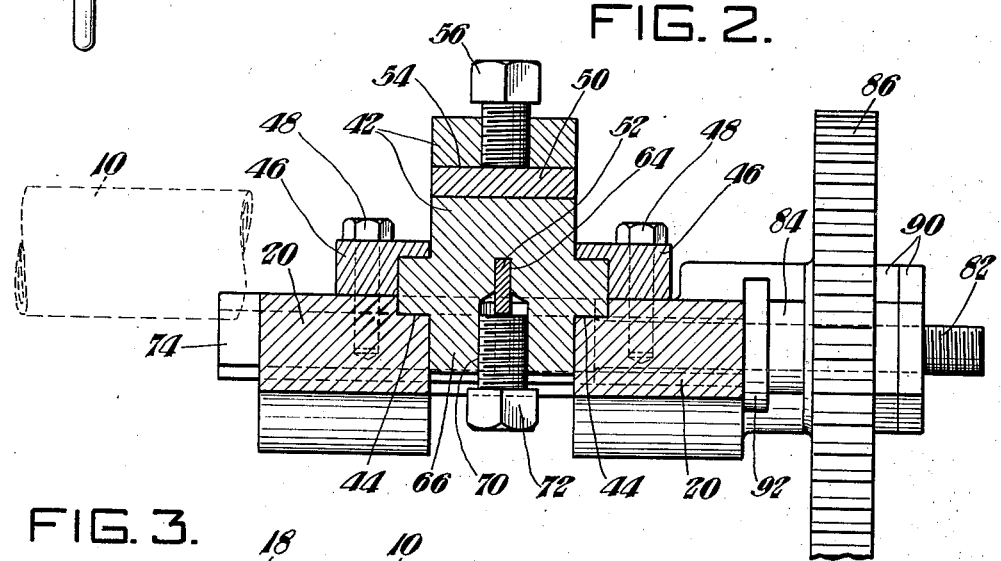
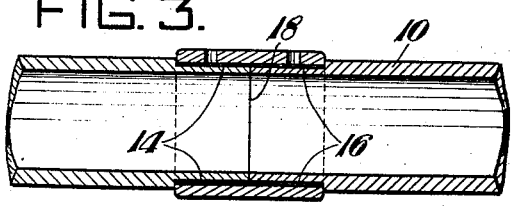
Inventors:
BOLTON C. MOISE
and JOHN RAE.
by John E. Jackson
their Attorney.

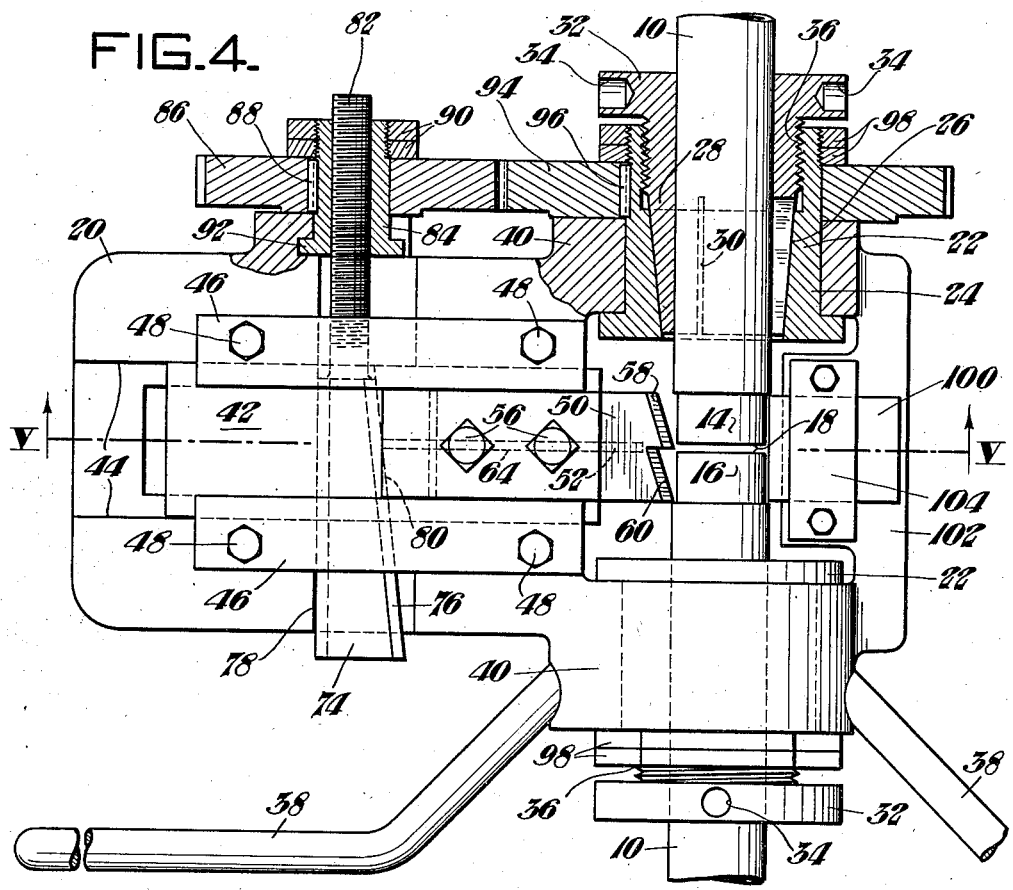
FIG. 4.
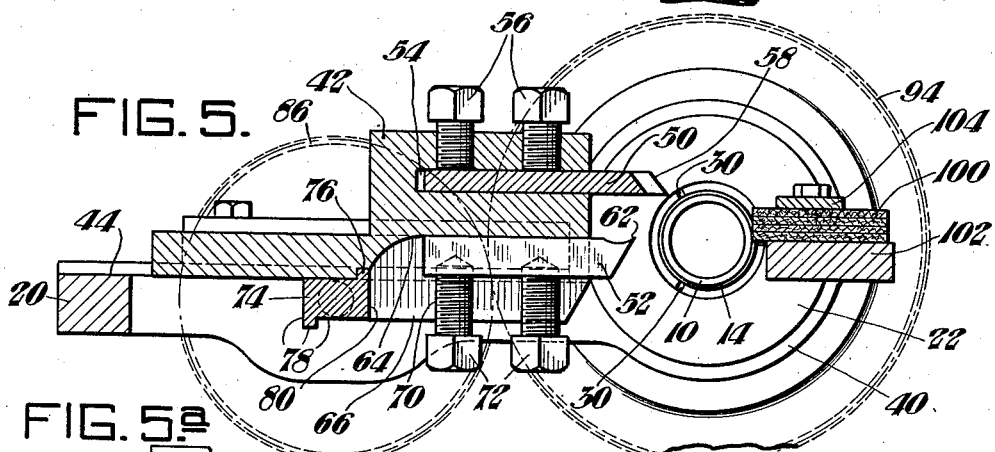
FIG. 5.
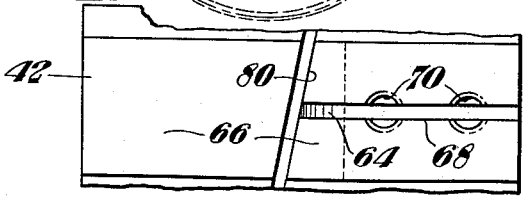
FIG. 5ᵃ.
Inventors:
Bolton C. Moise
and John Rae.
by John E. Jackson
their Attorney.

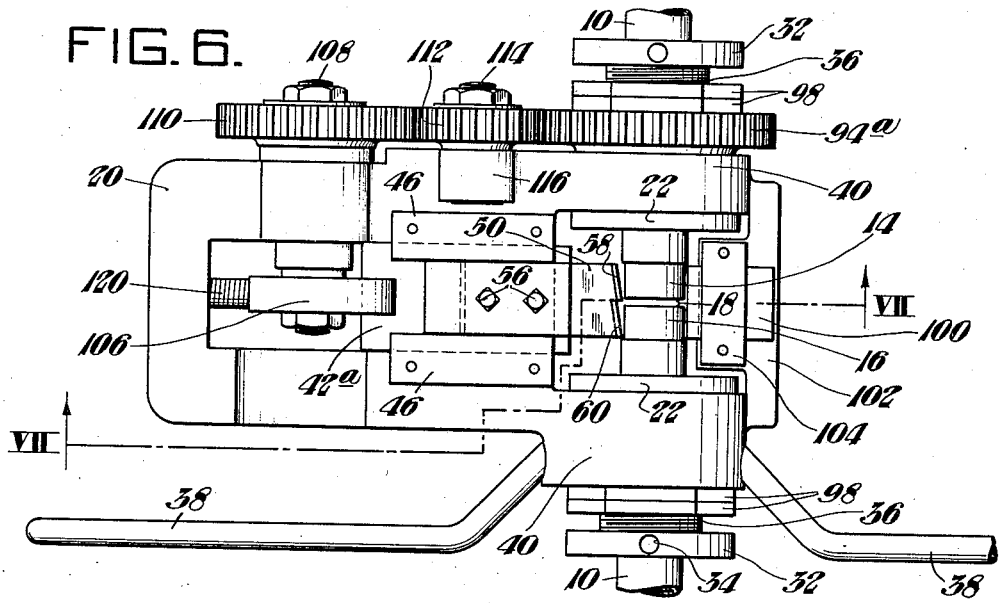

Patented July 11, 1939

2,165,646

UNITED STATES PATENT OFFICE 2,165,646

FINISHING AND SEVERING TOOL

Bolton C. Moise, Pittsburgh, and John Rae, Ellwood City, Pa., assignors to National Tube Company, a corporation of New Jersey Application August 9, 1938, Serial No. 223,984

12 Claims. (Cl. 82—4)

This invention relates to an improved tool for finishing the peripheral surface of a cylindrical article and severing the same at a point intermediate the finished surface in practically one continuous operation. While not limited thereto, the tool is well suited for turning the exterior surface of tubing and severing it preparatory to coupling of the tubing by standard types of couplings. For example, when using soldered or brazed pipe couplings wherein capillary attraction is utilized to spread the sealing medium between the surfaces to be joined, it is advantageous in the interest of securing an effective, strong and liquid-tight joint to have the pipe ends round and smooth within close tolerances. Since commercial sizes of iron or steel pipe are not generally furnished with the required tolerances and frequently have a rough or scaly exterior surface, it is desirable to properly prepare the ends of the pipe in order that a satisfactory joint or coupling will be made. The end of standard pipes or tubes furnished by the mill can be readily prepared at the mill and coated with a suitable metal to serve as a sealing medium when the joint is made. However, in most installations it is necessary to cut the standard lengths to suit installation requirements. In such cases, it is highly important that the meeting ends of the pipes or tubing be specially prepared. The tool of our invention is peculiarly well suited for severing pipe and, at substantially the same operation, for finish turning the peripheral surface thereof for proper engagement with smooth bored cylindrical couplings.

The novel and advantageous features of the invention will be fully apparent from the following detail disclosure, when read in connection with the accompanying drawings, and will be pointed out with particularity in the appended claims.

In the drawings:

Figure 1 is a plan illustrating one embodiment of the invention;

Figure 2 is a longitudinal vertical section on line II—II of Figure 1;

Figure 3 is a detail of a pipe joint, wherein the contiguous ends of the pipe shown have been prepared by our improved tool;

Figure 4 is a view similar to Figure 1 on a larger scale, with portions broken away and shown in section in the interest of clearness;

Figure 5 is a detail section on line V—V of Figure 4;

Figure 5a is a detail plan of a tool holder;

Figure 6 is a plan similar to Figure 4, illustrating an alternative embodiment of the invention;

Figure 7 is a view approximately on staggered section line VII—VII of Figure 6;

Figure 8 is a view similar to Figure 7 illustrating a modified type of selective adjustable tools; and Figure 9 is a plan of the right hand portion of Figure 8.

Referring first to the embodiment of the invention illustrated in Figures 1 to 5, inclusive, 10 represents a cylindrical article such as a pipe or tube which is to have an intermediate portion of its peripheral face turned to a smooth and true surface, and is to be severed intermediate the outer extremities of such finished surface by the tool of our present invention. The article 10 may be conveniently held during the operation by any suitable means, such as a pipe vise 12 or the like. In Figures 1 to 4 the peripheral surfaces of the article are shown as having been finished at 14 and 16 and as having been severed at 18.

It is to be understood that although these figures show the pipe or other cylindrical article as having been severed and surface-turned, the same was originally a continuous, unfinished and uncut length prior to having been acted upon by our improved device.

Our improved device comprises a carrier rotatable about the axis of the cylindrical article to be operated upon, a tool holder carrying a plurality of tools, one of which is positioned for a substantially tangential engagement with the periphery of the article, and the other of which is positioned to sever the article about midway between the ends of the finished surfaces, the tool holder and tools being automatically fed into operative engagement with the work in response to the relative rotary movement between the article and the carrier.

Figure 3 illustrates the contiguous ends of two lengths of pipe which have been severed and surface finished by our improved tool so that such ends are properly conditioned for receiving a coupling sleeve adapted to be permanently secured by the introduction of suitable sealing medium, such as solder or the like.

The carrier, indicated as a whole at 20, is rotatably mounted on bearing elements 22—22 which are adapted to be secured to the cylindrical article 10. As best shown in Figure 4, each rotatable bearing element 22 has a trunnion portion 24 for engagement with the bore of the carrier 20. The interior bore 26 of the bearing element is tapered, and fitted to this tapered bore there is a tapered bushing 28 having kerfs 30 formed therein. At its outer end the bushing has an annular flange 32 formed with the plurality of openings 34 for engagement with a spanner wrench so that, by turning the bushing, the interengagement of the screw thread connection 36 between the bearing element 22 and the bushing 28 will constrict the tapered portion of the bushing about the article 10, thus fixedly securing the bearing element 22 to the article.

The bore of the carrier 20 makes a working fit with the trunnion portion of the bearing element and, as thus arranged, the carrier can be readily rotated about the longitudinal axis of the article 10 by manipulation of handles 38 which extend radially from the hub portions 40 of the carrier.

A tool holder 42 is slidably mounted in a guide groove 44 formed in the carrier and is retained therein by suitable gibs 46 secured to the carrier by bolts 48. The tool holder carries a finishing or turning tool 50 and severing tool 52. The turning tool 50 is positioned in the tool holder in a grooved seat 54 and clamped in proper position by set-screws 56.

The finishing or turning tool, as viewed in plan, is formed with two beveled cutting portions 58 and 60, each of which is inclined at an acute angle to the longitudinal axis of the pipe or other cylindrical article 10. These beveled cutting portions 58 and 60 are disposed on opposite sides of the median line of the tool 50, as viewed in plan, and may be defined as staggered beveled portions, each of which makes an acute angle with the axis of the article. The severing tool 52, as will be apparent from the dotted lines in Figure 4, is so positioned that it may be defined as being disposed in a plane which is substantially coincident with the median line of the tool 50. As shown in Figure 5, the severing tool is spaced from or positioned below the finishing tool 50, and the cutting edge 62 of the severing tool is arranged to be moved radially toward the longitudinal axis of the pipe or other cylindrical article 10.

The severing tool 52 is fitted in a grooved seat 64 formed in the tool holder, the lower portion 66 of the tool holder being kerfed at 68, which thus provides the split threaded openings 70 for engagement with tool holding set-screws 72.

It is deemed advantageous to provide means for automatically and progressively advancing both the finishing and severing tools into proper cutting engagement with the work in response to the rotation of the carrier. To these ends, we provide mechanism effective to first cause the finishing tool to properly turn the exterior surface of the article and then to cause the severing tool to sever the article substantially or approximately midway between the outer extremities of the finishing surfaces 14 and 16.

For accomplishing this progressive feeding or advancing of the finishing and severing tools in the embodiment shown in Figure 1 to 4, inclusive, we provide a wedge-like tool holder advancing member 74 having an inclined rib 76 riding in a suitable groove formed in the under side of the tool holder, this advancing member 74 being slidably mounted in a guideway 78 formed in the carrier 20. As thus arranged it will be apparent that, as the member 74 is moved transversely of the tool holder, the latter will be advanced toward the article 10 so as to thus progressively force the turning and severing tools into operative engagement with the work, it being apparent that the inclined face at the right of Figure 4 of the member 74 exerts a camming action on the rear edge 80 of the downwardly extending portion of the tool holder.

The tool holder advancing member 74 has a threaded shank 82 which coacts with a feed nut 84 which is engaged with a planetary pinion 86 and compelled to rotate therewith by a key 88, suitable jam nuts 90 being provided to secure the parts in assembled relation and the feed nut having a flanged portion 92 engaging a bearing groove formed in the carrier member, as shown.

The planetary pinion 86 meshes with a gear 94 which is held against rotation by a key 96 seated in the bearing element 22, which element carries threaded positioning collars 98 for maintaining the parts in proper assembled relation.

As best shown in Figures 1 and 5, a wiper-element 100 comprising a plurality of plys of suitable textile material is supported on a shelf 102 in a location approximately diametrically opposite the severing tool, this wiper element being held in proper position by a keeper bar 104.

Because of the coordinate relationship of the parts described, it will be apparent that if the relative rotary movement is effected between the cylindrical article 10 and the carrier, the pinion 86 will rotate the feed nut 84 which, through member 74, will feed the tool holder and tools carried thereby progressively toward the cylindrical article and will thus first turn the peripheral surface thereof and will later sever the work approximately midway between the outer extremities of the finished surface. Because the finishing tool is positioned to engage the work substantially tangentially, it will be appreciated that upon completion of its finish-cutting function it may be continuously fed across the outer finished surface of the work, while the severing tool continues to be fed into the work to complete the severing thereof. Thus the operator need not give special consideration to the particular time at which the finishing cut is completed nor to the time that the severing tool starts its operation, once these tools have been properly set for a given diameter of article or work-piece.

Upon completion of a predetermined number of bodily revolutions of the carrier, it will be appreciated that the finishing tool will be progressively advanced substantially tangentially to the cylindrical article undergoing treatment and, because of the position of the finishing tool and the provision of the staggered inclined beveled cutting edges, as the tool is advanced over the periphery of the work, different portions of the inclined cutting edge will be successively brought into coaction with the surface of the article. This effects a gradual distribution of the cutting load and contributes to the uniformity of cutting action and results in the production of a smoother surface with less tool chattering than would otherwise be the case.

In Figures 6 and 7 we have illustrated a modification wherein the tool holder, instead of being operated by a transversely sliding member 74, is actuated by a cam 106 whose working face is plotted to impart a substantially constantly progressing movement to the tool holder 42ᵃ. This cam 106 is carried by a shaft 108 to which is also secured a pinion 110 similar to the pinion 86 previously described, said pinion 110 being driven from gear 94ᵃ through an idler 112 carried by a stud 114 secured to a suitable boss 116 formed on the carrier. Depending from the under side of the tool holder there is a pin 118 to which one end of a spring 120 is secured. At its opposite end the spring engages a spring anchorage 122, thus serving to automatically return the tool holder to starting position after the cam has made one complete revolution. The remaining parts of the embodiment of the invention illustrated in Figures 6 and 7 need not be described in detail as they so closely resemble the corresponding parts shown in Figures 1 to 5, inclusive.

The embodiment of the invention illustrated in Figures 8 and 9, insofar as the carrier and supporting means for the tool holder are concerned, is substantially a duplication of similar parts shown in Figures 1 to 8, inclusive. The distinctive feature of the embodiment of the invention in Figures 8 and 9 is that both the finishing and the severing tools are provided with cutting faces located at varying distances from a respective axial support by which they are carried. For example, the finishing cutter 124 is provided with a plurality of cutting faces 124a, 124b and 124c of progressively decreasing radial distances from the axis of a fixed stub-shaft 128 mounted on hub portions of arms 129 by the tool holder. As so arranged, it will be understood that, by turning a selected one of the cutting faces into operative position, the tool can be set for proper coaction with articles of different diameter to be finished.

The stub-shaft carries an integral collar 130 provided with serrated teeth 132 for cooperation with complementary teeth formed on a hub of the cutter. The outer extremity of the stub-shaft is threaded, as indicated at 134, for coaction with a thumb nut 136. A sleeve 138 is forced by the thumb nut against the hub 140 of the cutter so that, in coaction with the serrated parts on the opposite side of the cutter, the latter can be set to selectively lock any one of the cutting faces in a position corresponding to that required for a given diameter of the article to be machined.

The severing tool 126 is similarly provided with a plurality of cutter faces 126a, 126b and 126c mounted on a stub-shaft 142 carried by the arms 143 of the tool holder. The outer end of this shaft is threaded at 144 for coaction with a thumb nut 146, and this thumb nut operates to hold or lock the severing cutter in the desired position in substantially the same manner as described above in connection with the finishing cutter 124.

We claim:

1. A device for severing and finishing cylindrical articles comprising a carrier, a bearing including means for fixedly securing it to the article, said carrier being rotatably supported by said bearing and having a tool holder movably mounted thereon, a finishing tool secured to the holder in position for movement tangentially across the peripheral face of the article, a severing tool secured to the holder in position for movement radially of the article, and means for automatically advancing said holder upon rotation of said carrier.

2. A device for severing and finishing cylindrical articles comprising a carrier, a bearing including means for fixedly securing it to the article, said carrier being rotatably supported by said bearing, a tool holder movably mounted on the carrier, a finishing tool secured to the holder in position for movement tangentially across the peripheral face of the article, a severing tool secured to the holder in position for movement radially of the article, a gear secured to said bearing, a planetary pinion actuated thereby upon rotation of the carrier about the bearing, and means actuated by said planetary pinion for advancing said tool holder.

3. A device for severing and finishing cylindrical articles comprising a carrier, a bearing element making a working fit therewith and having a tapered bore, a split bushing having an exterior portion to fit the taper of said bearing element and having a threaded portion screwed into the bearing element, a tool holder slidably mounted on the carrier, respective finishing and severing tools carried by the tool holder, and means responsive to rotation of the carrier about said bearing element effective to progressively feed said tool holder and tools into cutting engagement with such cylindrical articles.

4. A device for severing and finishing cylindrical articles comprising a carrier, a bearing element making a working fit therewith and having a tapered bore, a split bushing, the exterior of which is shaped to fit the said tapered bore, a tool holder slidably mounted on the carrier, respective finishing and severing tools carried by the tool holder, a gear secured fixedly to said bearing element, mechanism including a planetary pinion actuated by said gear, and means actuated by said planetary pinion for moving said tool holder and tools progressively toward such cylindrical articles.

5. A device for severing and finishing a cylindrical article comprising a carrier, means for rotatably supporting the same with freedom for rotary movement relative to such article, a tool holder carrying respective severing and finishing tools, the former being positioned thereon so that its cutting edge will be advanced substantially radially toward the axis of said articles upon movement of the tool holder, and the latter being so positioned that upon advance of the holder it will engage such cylindrical article substantially tangentially, and means responsive to relative rotary movement between the carrier and such article for progressively advancing said holder and tools.

6. A device for machining a cylindrical article comprising a carrier, means for rotatably supporting the same for movement about the longitudinal axis of such article, a tool holder slidably mounted on the carrier, a tool secured to the carrier in position to finish the peripheral surface of the article and making a substantially tangential engagement with such article and having a beveled cutting portion which viewed in plan is inclined at an acute angle to the longitudinal axis of such article.

7. A device for severing and finishing a cylindrical article comprising a carrier, means for rotatably supporting the same for movement about the longitudinal axis of such article, a tool holder slidably mounted on the carrier, respective tools secured to the carrier in positions to finish the peripheral surface of the article and sever it at a plane between the extremities of the finished surface, the said finishing tool being positioned for substantially tangential engagement with such article and having a pair of beveled cutting portions which viewed in plan are disposed on opposite sides of the median line thereof providing staggered angular cutting elements, said severing tool being disposed in a plane intersecting said median line of the finishing tool.

8. A device for severing and finishing a cylindrical article comprising a carrier, means for rotatably supporting the same for movement about the longitudinal axis of such article, a tool holder slidably mounted on the carrier, a finishing tool secured thereto having offset beveled portions on opposite sides of the median line thereof, each beveled portion being inclined in plan at an acute angle to the axis of such article, a severing tool spaced from the finishing tool and disposed in a plane which is substantially coincident with the median line of the finishing tool, whereby upon rotation of said carrier about the axis of such cylindrical article the latter is severed substantially or approximately midway between the outer extremities of the surface finished by said finishing tool.

9. A device for severing and finishing cylindrical articles comprising a carrier, means for rotatably supporting the same on such articles, respective tools movably mounted on the carrier in position to finish the peripheral surface of the article and to sever it at a plane between the extremities of such finished surface, and a wiper positioned approximately opposite such tools and adapted to engage such articles so as to free the same of cuttings severed by said tools.

10. A device for severing and finishing cylindrical articles comprising a carrier, means for rotatably supporting the same relative to such articles, a tool holder slidably mounted on the carrier, means responsive to rotary movement of the carrier effective to advance the tool holder toward said article, a tool axially mounted on said holder and having a plurality of cutting edges located at different radial distances from the axis of said mounting, and locking means whereby the tool can be readily adjusted for operation on articles of different diameters.

11. A device for severing and finishing cylindrical articles comprising a carrier, means for rotatably supporting the same relative to such articles, a tool holder slidably mounted on the carrier, means responsive to rotary movement of the carrier effective to advance the tool holder toward said article, said tool holder carrying a stub-shaft, a tool mounted thereon having a plurality of cutting edges located at different radial distances from the axis of the stub-shaft whereby it may be set for coaction with articles of different diameters.

12. A device for severing and finishing cylindrical articles comprising a carrier, means for rotatably supporting the same relative to such articles, a tool holder slidably mounted on the carrier, means responsive to rotary movement of the carrier effective to advance the tool holder toward said article, said tool holder carrying a stub-shaft, a tool mounted thereon having a plurality of cutting edges located at different radial distances from the axis of the stub-shaft whereby it may be set for coaction with articles of different diameters, and means for selectively locking one of said edges in cutting position.

BOLTON C. MOISE.
JOHN RAE.